US012664674B2

(12) United States Patent　　　(10) Patent No.:　US 12,664,674 B2
Takahashi　　　　　　　　　　　　　　(45) Date of Patent:　Jun. 23, 2026

(54) TARGET MONITORING DEVICE, TARGET MONITORING METHOD, AND RECORDING MEDIUM

(71) Applicant: FURUNO ELECTRIC CO., LTD., Hyogo (JP)

(72) Inventor: Yuta Takahashi, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 0 days.

(21) Appl. No.: 18/731,336

(22) Filed: Jun. 2, 2024

(65) Prior Publication Data

US 2024/0320846 A1　　Sep. 26, 2024

Related U.S. Application Data

(63) Continuation of application No. PCT/JP2022/014831, filed on Mar. 28, 2022.

(30) Foreign Application Priority Data

Dec. 16, 2021　(JP) ................................. 2021-203919

(51) Int. Cl.
*G06T 7/60*　　　　(2017.01)
*G01S 13/08*　　　(2006.01)
(Continued)

(52) U.S. Cl.
CPC ................ *G06T 7/60* (2013.01); *G01S 13/08* (2013.01); *G01S 13/867* (2013.01); *G06V 20/60* (2022.01);
(Continued)

(58) Field of Classification Search
CPC ... G06T 7/60; G06T 2207/30181; G06T 7/62; G01S 13/08; G01S 13/867; G01S 13/58;
(Continued)

(56) References Cited

U.S. PATENT DOCUMENTS 8,265,866 B2 * 9/2012 Altamura ........... G01C 21/3602
　　　　　　　　　　　　　　　　　　　　701/426
8,296,001 B1 * 10/2012 Kabel ...................... G08G 3/02
　　　　　　　　　　　　　　　　　　　　701/410

(Continued)

FOREIGN PATENT DOCUMENTS

EP　　　　3499483　　　6/2019
JP　　　S62204178　　　9/1987
(Continued)

OTHER PUBLICATIONS

"International Search Report (Form PCT/ISA/210) of PCT/JP2022/014831", mailed on Jun. 14, 2022, with English translation thereof, pp. 1-4.

*Primary Examiner* — Asmamaw G Tarko

(74) *Attorney, Agent, or Firm* — JCIPRNET

(57)　　　　　　ABSTRACT

A target monitoring device includes: a data acquiring unit, acquiring image data including a ship observed by an imaging sensor; an image recognizing unit, detecting a region of the ship included in the image data; a distance acquiring unit, acquiring a distance to the ship from an observation position detected by a sensor that is different from the imaging sensor; a course acquiring unit, acquiring a course of the ship detected by the sensor that is different from the imaging sensor; and a ship body length estimating unit, estimating a ship body length of the ship based on a dimension of the region of the ship in a horizontal direction, the distance to the ship, and the course of the ship.

17 Claims, 8 Drawing Sheets

(51) Int. Cl.
  *G01S 13/86* (2006.01)
  *G06V 20/60* (2022.01)
  *H04N 7/18* (2006.01)

(52) U.S. Cl.
  CPC ... *H04N 7/181* (2013.01); *G06T 2207/30181*
  (2013.01)

(58) Field of Classification Search
  CPC ....... G01S 13/72; G01S 13/937; G06V 20/60;
        H04N 7/181; H04N 7/18; G01B 11/02
  USPC .................. 348/143, 169, 135; 382/103, 286
  See application file for complete search history.

(56) References Cited

U.S. PATENT DOCUMENTS

| | | | | |
|---|---|---|---|---|
| 9,826,164 | B2 * | 11/2017 | Pryszo | G06T 11/206 |
| 10,444,349 | B2 * | 10/2019 | Gatland | G01C 21/203 |
| 11,328,155 | B2 * | 5/2022 | Rivers | G01C 21/1656 |
| 2012/0158287 | A1 * | 6/2012 | Altamura | G06T 11/00 |
| | | | | 701/519 |
| 2014/0160165 | A1 * | 6/2014 | Kim | G01C 21/005 |
| | | | | 345/633 |
| 2014/0253597 | A1 * | 9/2014 | Dohi | G01C 21/203 |
| | | | | 345/656 |
| 2014/0354466 | A1 * | 12/2014 | Nomura | G01S 7/04 |
| | | | | 342/146 |
| 2015/0015712 | A1 * | 1/2015 | Sempuku | H04N 7/183 |
| | | | | 348/148 |
| 2015/0330803 | A1 * | 11/2015 | Okuda | G01C 21/20 |
| | | | | 701/538 |
| 2015/0330804 | A1 * | 11/2015 | Okuda | G09B 29/007 |
| | | | | 701/487 |
| 2015/0350552 | A1 * | 12/2015 | Pryszo | H04N 23/695 |
| | | | | 348/143 |
| 2017/0160393 | A1 * | 6/2017 | Gatland | G01S 7/6281 |
| 2017/0253308 | A1 * | 9/2017 | Morita | G01S 7/12 |
| 2017/0287340 | A1 * | 10/2017 | Suzuki | G08G 3/02 |
| 2019/0163984 | A1 * | 5/2019 | Shinohe | G06T 7/292 |
| 2019/0199898 | A1 * | 6/2019 | Yonishi | H04N 5/272 |
| 2019/0251356 | A1 * | 8/2019 | Rivers | G01C 21/203 |
| 2020/0018848 | A1 * | 1/2020 | Rivers | G01S 7/16 |
| 2020/0031291 | A1 * | 1/2020 | Li | B60R 11/04 |
| 2020/0057488 | A1 * | 2/2020 | Johnson | G06T 19/20 |
| 2020/0074863 | A1 | 3/2020 | Jung et al. | |
| 2020/0089234 | A1 * | 3/2020 | Nishiyama | G06T 15/04 |
| 2020/0090367 | A1 * | 3/2020 | Nishiyama | H04N 23/63 |
| 2020/0090414 | A1 * | 3/2020 | Nishiyama | G01C 21/20 |
| 2021/0209785 | A1 * | 7/2021 | Unnikrishnan | G06V 10/764 |
| 2022/0185435 | A1 * | 6/2022 | Nishiyama | B63B 79/20 |
| 2022/0351523 | A1 * | 11/2022 | Kim | G01S 17/42 |
| 2024/0393805 | A1 * | 11/2024 | Motoyama | B64C 39/02 |
| 2024/0400170 | A1 * | 12/2024 | Zhou | G06Q 50/40 |

FOREIGN PATENT DOCUMENTS

| | | |
|---|---|---|
| JP | 2003172608 | 6/2003 |
| JP | 2012137446 | 7/2012 |
| JP | 5730565 | 6/2015 |
| JP | 2019118043 | 7/2019 |

* cited by examiner

TARGET MONITORING DEVICE, TARGET MONITORING METHOD, AND RECORDING MEDIUM

CROSS-REFERENCE TO RELATED APPLICATION

The present application is a continuation of PCT/JP2022/014831, filed on Mar. 28, 2022, and is related to and claims priority from Japanese patent application no. 2021-203919, filed on Dec. 16, 2021. The entire contents of the aforementioned application are hereby incorporated by reference herein.

TECHNICAL FIELD

The disclosure relates to a target monitoring device, a target monitoring method, and a recording medium.

RELATED ART

Japanese Patent No. 5730565 discloses a technique that calculates a ship length by using a radar.

However, since radar has a low azimuth resolution, it is difficult to determine the size of a ship from radar echoes.

The disclosure provides a target monitoring device, a target monitoring method, and a program capable of increasing the accuracy in estimating a ship body length.

SUMMARY

A target monitoring device according to an aspect of the disclosure includes processing circuitry configured to: acquire image data including a ship observed by an imaging sensor; detect a region of the ship included in the image data; acquire a distance to the ship from an observation position detected by a sensor that is different from the imaging sensor; acquire a course of the ship detected by the sensor that is different from the imaging sensor; and estimate a ship body length of the ship based on a dimension of the region of the ship in a horizontal direction, the distance to the ship, and the course of the ship. Accordingly, it is possible to improve the accuracy in estimating the ship body length.

In the aspect, it may also be that the processing circuitry is further configured to: estimate the ship body length of the ship further based on a particular ship body aspect ratio. Accordingly, it is possible to improve the accuracy in estimating the ship body length.

In the aspect, it may also be that the imaging sensor is a camera, and the processing circuitry is further configured to: calculate an occupancy angle of the ship in a view angle of the camera in the horizontal direction based on a dimension of the image data in the horizontal direction, the dimension of the region of the ship in the horizontal direction, and the view angle, and estimate the ship body length of the ship based on the occupancy angle of the ship, the distance to the ship, and the course of the ship. Accordingly, it is possible to improve the accuracy in estimating the ship body length.

In the aspect, it may also be that the processing circuitry is further configured to: calculate the occupancy angle of the ship in the view angle based on the dimension of the image data in the horizontal direction, the dimension of the region of the ship in the horizontal direction, the view angle of the camera in the horizontal direction, a focal point distance of the camera, and an optical center of the camera. Accordingly, it is possible to improve the accuracy in estimating the ship body length.

In the aspect, it may also be that the sensor that is different is a radar, and the processing circuitry is further configured to: acquire the distance to the ship based on data detected by the radar. Accordingly, it is possible to estimate the ship body length by using the distance to the ship detected by the radar.

In the aspect, it may also be that the sensor that is different is a radar, and the processing circuitry is further configured to: acquire the course of the ship based on data detected by the radar. Accordingly, it is possible to estimate the ship body length by using the course of the ship detected by the radar.

In the above aspect, it may also be that the processing circuitry is further configured to: detect a boundary box surrounding the ship included in the image data as the region of the ship. Accordingly, the dimension of the region of the ship in the horizontal direction is easily acquired.

In addition, a target monitoring method according to another aspect of the disclosure includes: acquiring image data including a ship observed by an imaging sensor; detecting a region of the ship included in the image data; acquiring a distance to the ship from an observation position detected by a sensor that is different from the imaging sensor; acquiring a course of the ship detected by the sensor that is different from the imaging sensor; and estimating a ship body length of the ship based on a dimension of the region of the ship in a horizontal direction, the distance to the ship, and the course of the ship. Accordingly, it is possible to improve the accuracy in estimating the ship body length.

In addition, a non-transient computer-readable recording medium records a program according to another aspect of the disclosure executed by a computer to: acquire image data comprising a ship observed by an imaging sensor; detect a region of the ship comprised in the image data; acquire a distance to the ship from an observation position detected by a sensor that is different from the imaging sensor; acquire a course of the ship detected by the sensor that is different from the imaging sensor; and estimate a ship body length of the ship based on a dimension of the region of the ship in a horizontal direction, the distance to the ship, and the course of the ship. Accordingly, it is possible to improve the accuracy in estimating the ship body length.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION OF EMBODIMENTS

In the following, the embodiments of the disclosure are described with reference to the drawings.

Figure 1:
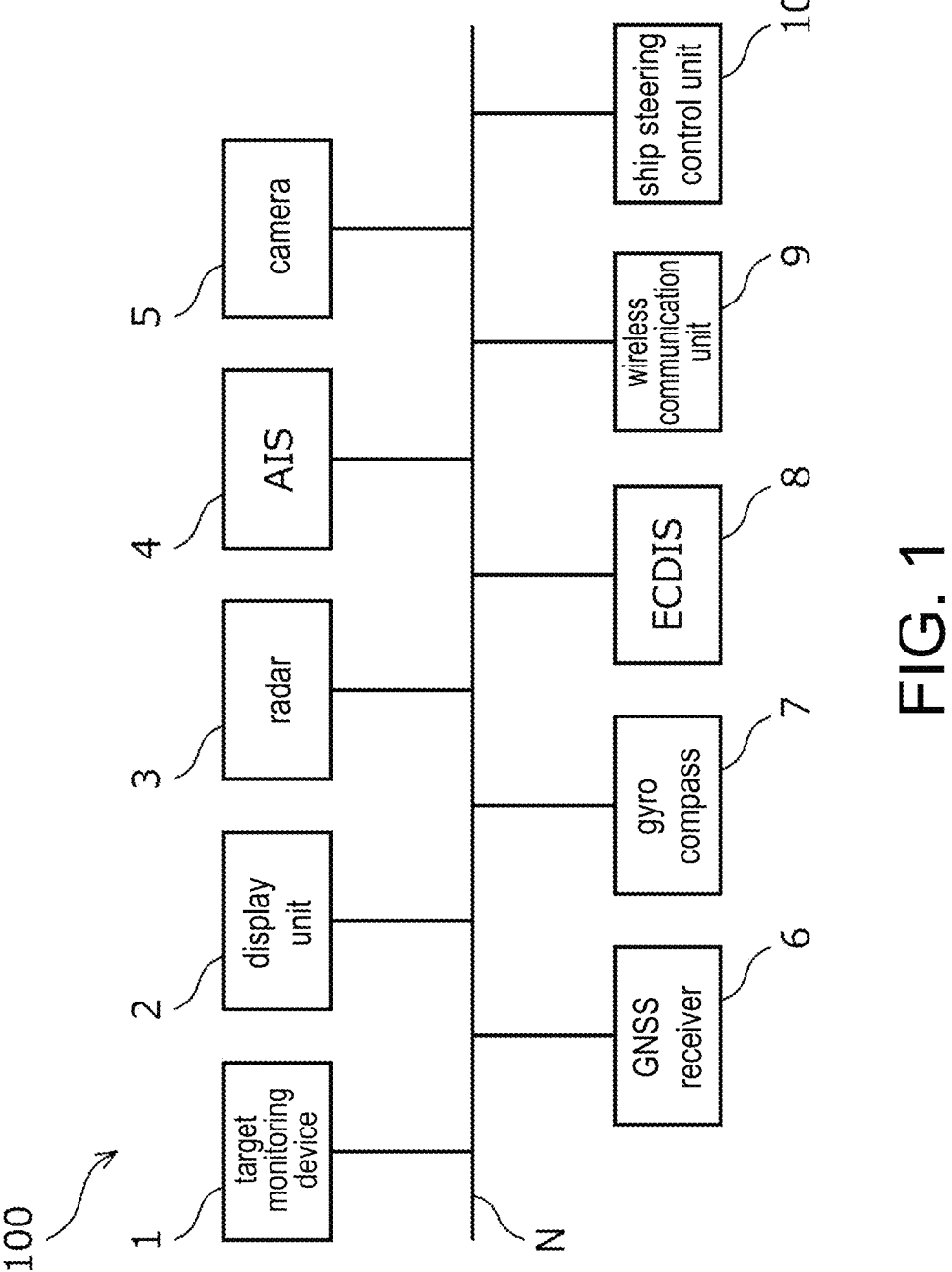
FIG. 1 is a diagram illustrating a configuration example of a target monitoring system.

FIG. 1 is a block diagram illustrating a configuration example of a target monitoring system 100. The target monitoring system 100 is a system mounted in a ship. In the following description, the ship in which the target monitoring system 100 is mounted is referred to as "own ship", and another ship is referred to as "other ship".

The target monitoring system 100 includes a target monitoring device 1, a display unit 2, a radar 3, an AIS 4, a camera 5, a GNSS receiver 6, a gyro compass 7, an ECDIS 8, a wireless communicating unit 9, and a ship steering control unit 10. Such components are connected with a network N, such as LAN, and are able to communicate with each other through network communication.

The target monitoring device 1 a computer that includes a CPU, a RAM, a ROM, a non-volatile memory, and an input/output interface, etc. The CPU of the target monitoring device 1 executes an information process in accordance with a program loaded from the ROM or the non-volatile memory to the RAM.

The program may also be supplied via an information storage medium, such as an optical disc or a memory card, and may also be supplied via a communication network such as the Internet or a LAN.

The display unit 2 displays a display image generated by the target monitoring device 1. The display unit 2 also displays a radar image, a camera image, or an electronic chart, etc.

The display unit 2, for example, is a display device having a touch sensor, i.e., a so-called touch panel. The touch sensor detects an indicated position in an image indicated by the user's finger, etc. However, the disclosure is not limited thereto. The indicated position may also be input by using a trackball, etc.

The radar 3 emits radio waves around the own ship, receives the reflected waves thereof, and generates echo data based on the received signals. In addition, the radar 3 recognizes a target from the echo data, and generates target tracking (TT) data indicating the position and the velocity of the target.

The automatic identification system (AIS) 4 receives AIS data from other ships present around the own ship or from land control. A VHF data exchange system (VDES) may also be used, instead of being limited to AIS. The AIS data include recognition symbols, ship names, positions, courses, velocities, ship types, ship body lengths, and destinations, etc., of other ships.

The camera 5 is a digital camera that images the outside from the own ship to generate image data. The camera 5 is disposed at a bridge of the own ship and toward a bow orientation, for example. The camera 5 may be a camera having pan/tilt/zoom functions, i.e., a so-called PTZ camera.

In addition, the camera 5 may also include an image recognizing unit that estimates a position and a type of a target, such as an other ship, included in the imaged image by using an object detecting model. In addition to the camera

5, the image recognizing unit may also be realized in other devices, such as the target monitoring device 1.

The GNSS receiver 6 detects the position of the own ship based on radio waves received from the global navigation satellite system (GNSS). The gyro compass 7 detects a bow orientation of the own ship. A GPS compass may also be used, instead of being limited to the gyro compass.

The electronic chart display and information system (ECDIS) 8 acquires the position of the own ship from the GNSS receiver 6 and displays the position of the own ship on an electronic chart. In addition, the ECDIS 8 also displays a planned route of the own ship on the electronic chart. A GNSS plotter may also be used, instead of being limited to ECDIS.

The wireless communication unit 9 includes various wireless components for ultra short wave band, very short wave band, medium and short wave band, short wave band, etc., for realizing the communication with other ships or land control.

The ship steering control unit 10 is a control device for realizing automatic ship steering, and controls a steering device of the own ship. In addition, the ship steering control unit 10 may also control the engine of the own ship.

In the embodiment, the target monitoring device 1 is an independent device. However, the disclosure is not limited thereto, and may also be integrated with another device, such as the ECDIS 8. That is, the functional units of the target monitoring device 1 may also be realized by other devices.

In the embodiment, the target monitoring device 1 is mounted in the own ship and used to monitor a target, such as an other ship, present around the own ship. However, the disclosure is not limited thereto. For example, the target monitoring device 1 may also be disposed in the land control and configured to monitor a ship present in a controlled sea area.

Figure 2:
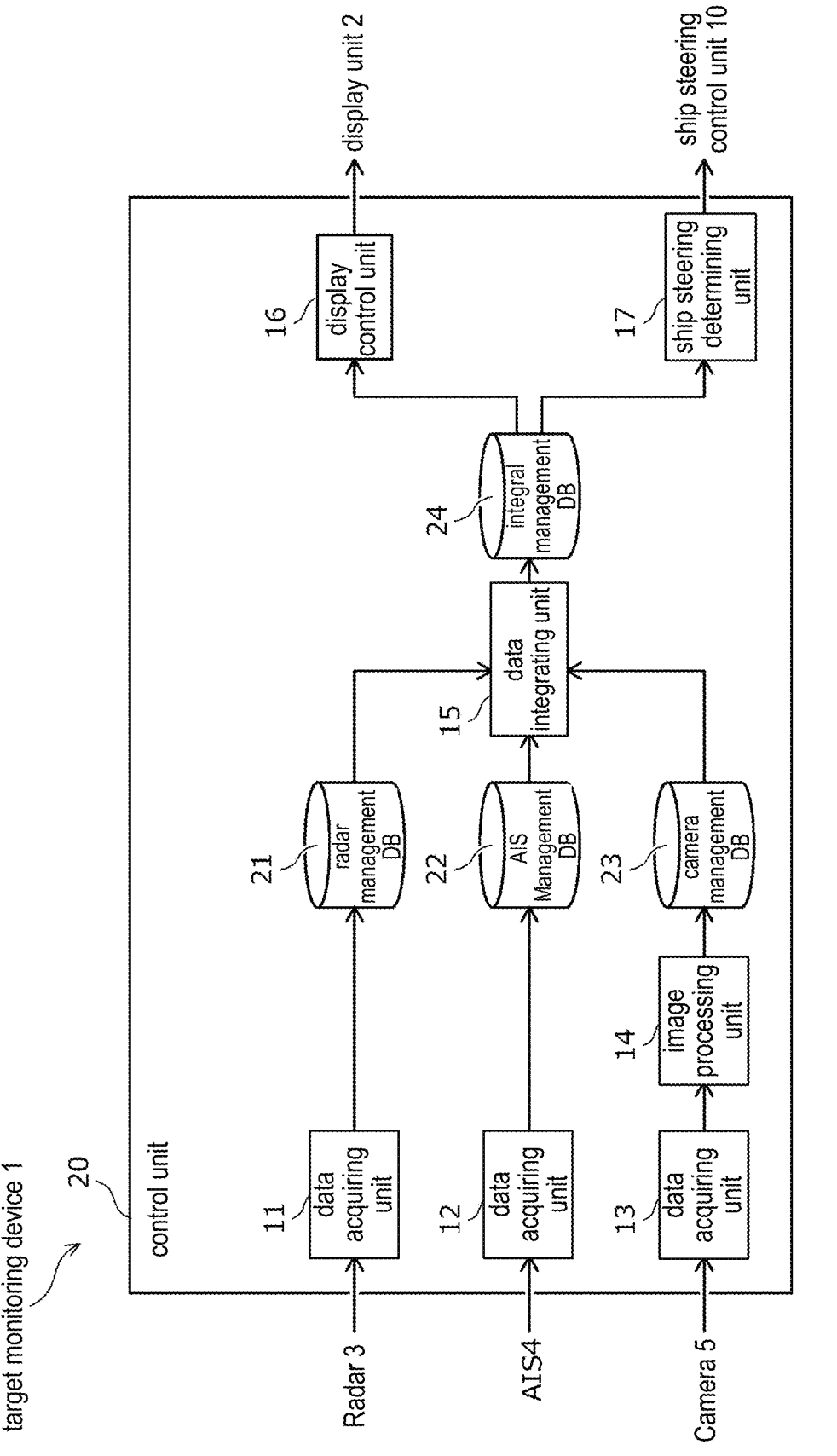
FIG. 2 is a diagram illustrating a configuration example of a target monitoring device.

FIG. 2 is a diagram illustrating a configuration example of the target monitoring device 1. The control unit 20 of the target monitoring device 1 includes data acquiring units 11, 12, 13, an image processing unit 14, a data integrating unit 15, a display control unit 16, and a ship steering determining unit 17. These functional units are realized by executing information processing according to a program by using the control unit 20.

The control unit 20 of the target monitoring device 1 further includes a radar management database (DB) 21, an AIS management DB 22, a camera management DB 23, and an integral management DB 24. The storage units thereof are provided in the memory of the control unit 20.

The data acquiring unit 11 sequentially acquires, as target data, TT data generated by the radar 3, and registers the target data in the radar management DB 21.

The target data registered in the radar management DB 21 include the position, the ship velocity, and the course, etc., of the target, such as an other ship, detected by the radar 3. The target data registered in the radar management DB 21 may further include the track of the target, the elapsed time since detection, the size of the echo image, and the signal strength of the reflected waves, etc.

The data acquiring unit 12 acquires, as target data, the AIS data received by the AIS 4 and registers the AIS data in the AIS management DB 22.

The target data registered in the AIS management DB 22 includes the position, the ship velocity, and the course, etc., of an other ship, detected by the AIS 4. The target data registered in the AIS management DB 22 may also include the type, the ship name, and the destination, etc., of the other ship.

The data acquiring unit 13 acquires an image including the target, such as an other ship, imaged by the camera 5. The data acquiring unit 13 sequentially acquires time-series images from the camera 5, and sequentially provides the time-series images to the image processing unit 14. The time-series images are, for example, still images (frames) included in motion image data.

The image processing unit 14 performs a particular image process, such as image recognition, on the image acquired by the data acquiring unit 13, generates target data of the target recognized from the image, and registers the target in the camera management database 23. Details of the image processing unit 14 will be described afterwards.

The target data registered in the camera management DB 23 includes the position, the ship velocity, and the course, etc., of the target, such as an other ship calculated by the image processing unit 14. The target data registered in the camera management DB may also include the size of the target, the type of the target, and the elapsed time from detection, etc.

The position of the target detected by the radar 3 and the position of the target recognized from the image imaged by the camera 5 are relative positions with respect to the own ship. Therefore, the positions can be converted into absolute positions by using the position of the own ship detected by the GNSS receiver 6.

The target detected by the radar 3 and the target recognized from the image imaged by the camera 5 are mainly ships, but may also include others such as a buoy.

The data integrating unit 15 registers the target data registered in the radar management DB 21, the AIS management DB 22, and the camera management DB 23 in the integral management DB 24 for cross-management of these databases. The target data registered in the integral management DB 24 include the position, the ship velocity, and the course, etc., of the target, such as an other ship.

In the case where the position included in the target data registered in one of the radar management DB 21, the AIS management DB 22, and the camera management DB 23 and the position included in the target data registered in another one of the radar management DB 21, the AIS management DB 22, and the camera management DB 23 are the same or similar, the data integrating unit 15 registers these target data in the integral management DB 24.

The display control unit 16 generates a display image including an object indicating the target based on the target data registered in the integral management DB 24 and outputs the display image to the display unit 2. The display image is, for example, a radar image, an electronic chart, or an image formed by synthesizing a radar image and an electronic chart. The object indicating the target is disposed at a position in the image corresponding to the actual position of the target.

The ship steering determining unit 17 performs ship steering determination based on the target data registered in the integral management DB 24, and, in a case of determining that it is necessary to avoid a target, causes the ship steering control unit 10 to perform an avoidance steering operation. Specifically, the ship steering control unit 10 calculates an avoidance route for avoiding the target by using an avoidance steering algorithm, and controls the steering device and an engine, etc., so that the own ship follows the avoidance route.

Figure 3:
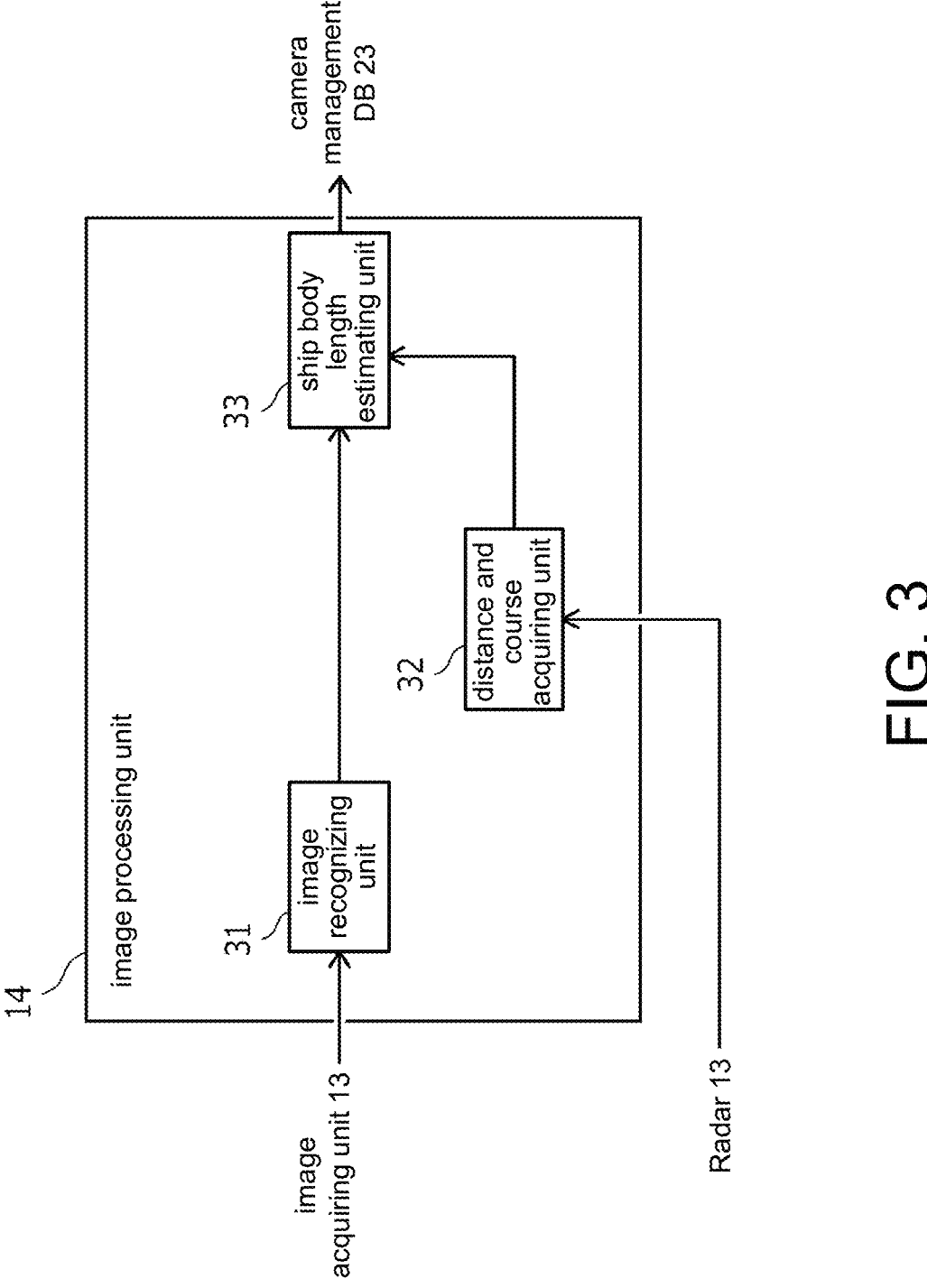
FIG. 3 is a diagram illustrating a configuration example of an image processing unit.

FIG. 3 is a diagram illustrating a configuration example of the image processing unit 14. The image processing unit 14 includes an image recognizing unit 31, a distance and course acquiring unit 32, and a ship body length estimating unit 33. The same figure illustrates a configuration relating to a function of estimating a ship body length of an other ship among the functions realized by the image estimating unit 14.

In the embodiment, the image processing unit 14 acquires an image including the target, such as an other ship, imaged by the camera 5 from the data acquiring unit 13. The camera 5 is an example of an imaging sensor. However, the disclosure is not limited thereto. The image data under observation may also be acquired by other imaging sensors, such as a light detection and ranging (LiDAR). It is assumed that the imaged data observed through LiDAR is also included in the image data.

The image recognizing unit 31 detects a region of a ship included in the image acquired by the data acquiring unit 13. Specifically, the image recognizing unit 31 calculates the region of the ship included in the image, the type of the target, and the estimation reliability by using a learned model generated in advance through machine learning. The type of the target may be a ship type, such as a tanker or a fishing boat. However, the disclosure is not limited thereto. The image recognizing unit 31 may also recognize the region included in the image and the type of the target by using a rule base.

The learned model is an object detection model, such as a single shot multibox detector (SSD) or a you only look once (YOLO), and detects a boundary box surrounding the ship included in the image as the region of the ship. However, the disclosure is not limited thereto. The learned model may also be a region split model, such as semantic segmentation or instance segmentation.

Figure 4:
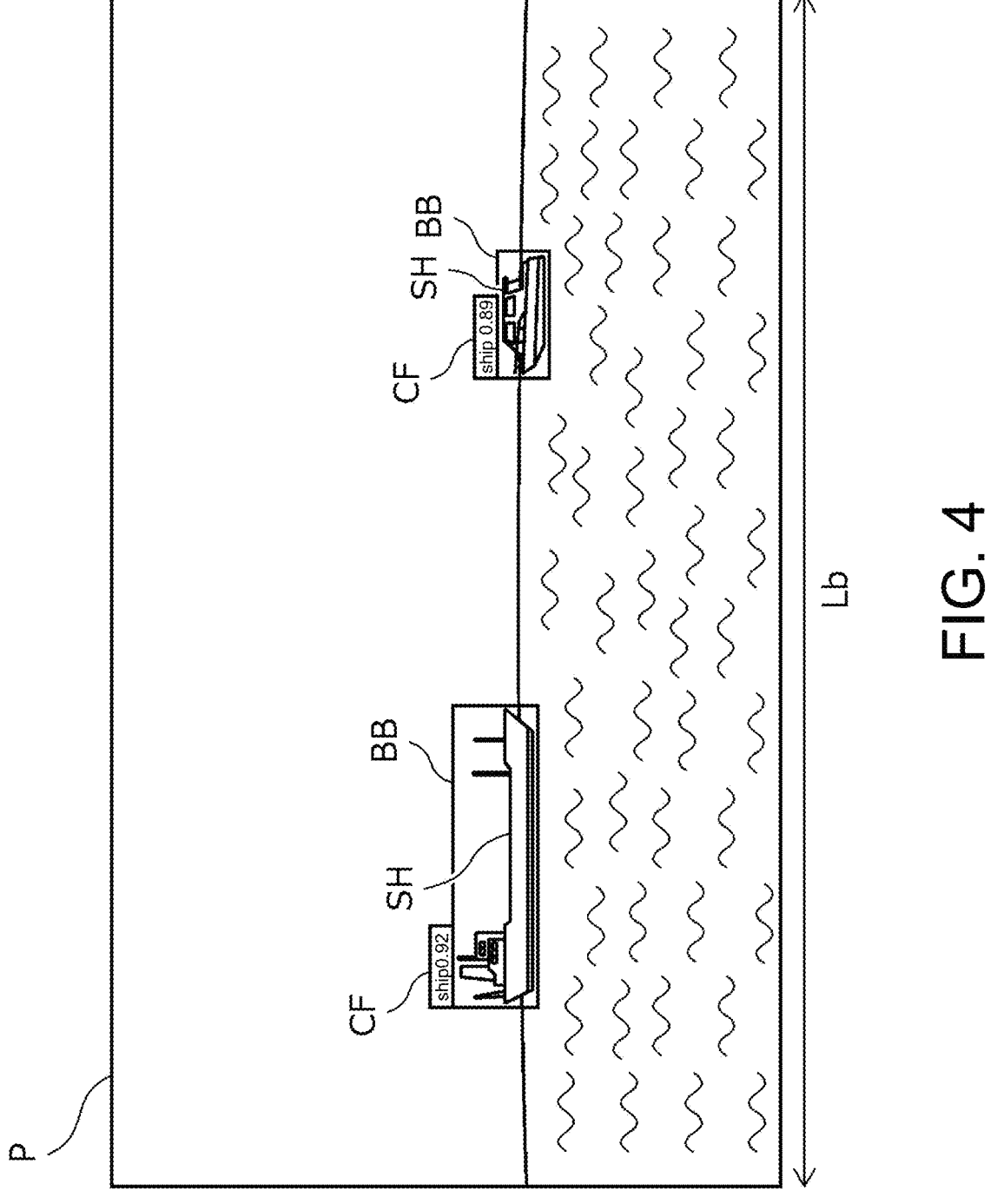
FIG. 4 is a diagram illustrating a recognition example of an image.
Figure 5:
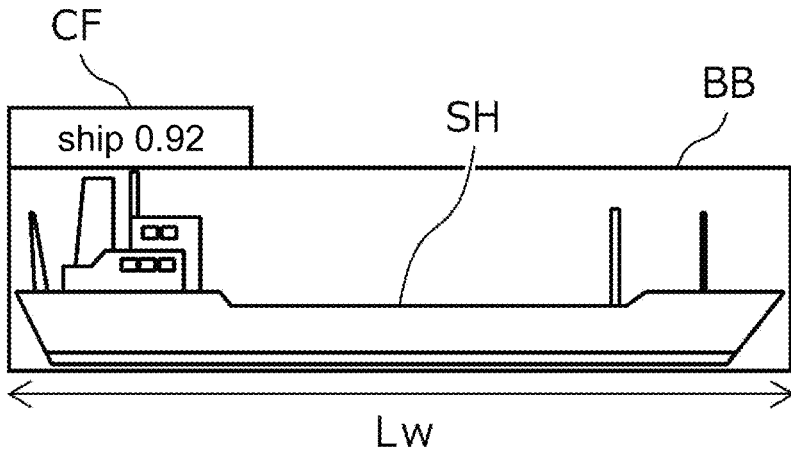
FIG. 5 is a diagram illustrating an example of a boundary box.

FIG. 4 is a diagram illustrating a recognition example of an image P. FIG. 5 is a diagram in which a boundary box BB is enlarged. As shown in these figures, an other ship SH included in the image P is surrounded by the boundary box BB in a rectangular shape. A label CF in which the type of the target and the estimation reliability are recorded is added to the boundary box BB.

Lb in FIG. 4 indicates the dimension of the image P in the horizontal direction. Lw in FIG. 5 indicates the dimension of the region of the other ship SH in the horizontal direction, that is, the dimension of the boundary box BB in the horizontal direction. The horizontal direction of the image is a direction corresponding to the horizontal direction in the actual space, and is the left-right direction in the illustrated example. The dimension is represented by using the number of pixels, for example.

Since the dimension Lw of the region of the other ship SH in the horizontal direction as detected from the image changes in accordance with the distance or the orientation with the ship SH, it is difficult to obtain the ship body length of the other ship SH by using only the dimension Lw. Therefore, in the embodiment, by using the data of the other ship SH detected by using a target detecting unit other than the camera 5, the accuracy in estimating the ship body length is increased.

The distance and course acquiring unit 32 acquires the distance from the own ship to the other ship and the course of the other ship from the TT data generated by the radar 3. Specifically, the distance and course acquiring unit 32 reads the target data of the other ship serving as the target from the radar management DB 21, and acquires the distance from the own ship to the other ship and the course of the other ship from the read target data. The radar 3 is an example of "a sensor that is different".

The course of the other ship is, for example, a course over ground (COG) of the other ship. However, the disclosure is not limited thereto. A heading (HDG) of the other ship may also be used. Although HDG may be used to estimate the ship body length, in the embodiment, COG is used for its ease of being acquired.

Figure 6:
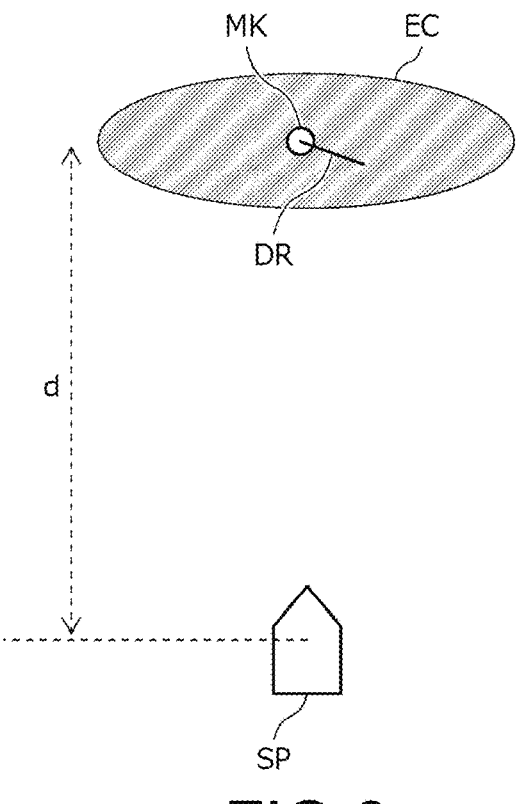
FIG. 6 is a diagram illustrating an example of an echo.

As shown in FIG. 6, according to an echo EC detected by the radar 3, a distance d to a target MK and a course DR of the target MK can be specified. However, since the echo EC forms a shape that expands in an angular direction, that is, the azimuth resolution of the radar 3 is low, it is difficult to specify the size of the target MK from the magnitude of the echo EC. In particular, the difficulty increases as the distance d increases.

Figure 7:
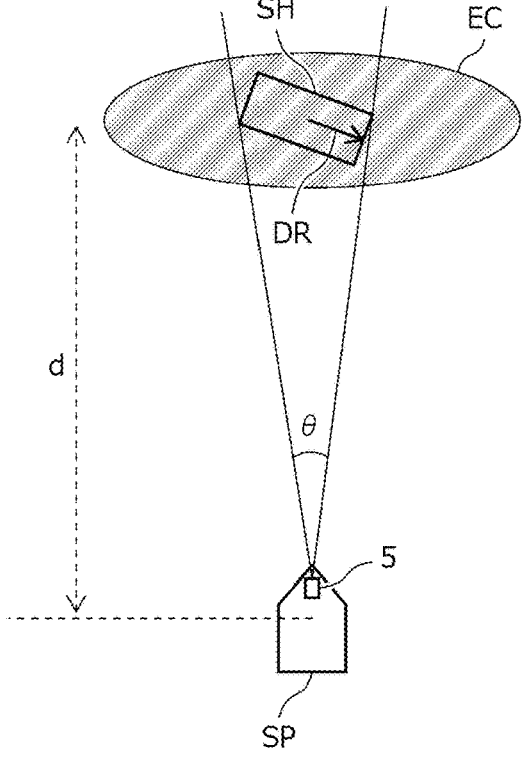
FIG. 7 is a diagram illustrating an example of an echo.

Therefore, in the embodiment, as shown in FIG. 7, by combining an azimuth width (occupancy angle) $\theta$ of the other ship SH acquired by the camera 5 having a high azimuth resolution, and the distance d and the course DR of the other ship SH acquired by the radar 3 having a high distance resolution, the accuracy in estimating the ship body length of the other ship SH is increased.

The distance and course acquiring unit 32 may also acquire the distance from the own ship to the other ship and the course of the other ship from the AIS data received from the AIS 4.

The ship body length estimating unit 33 estimates the ship body length of the other ship based on the dimension of the region of the other ship in the horizontal direction as detected by the image recognizing unit 31 as well as the distance and the course of the other ship acquired by the distance and course acquiring unit 32. In addition, the ship body length estimating unit 33 estimates the ship body length of the other ship further based on a particular ship body aspect ratio. Before the ship body length is estimated, a pre-process, such as distortion calibration on the image, may also be applied.

Figure 8:
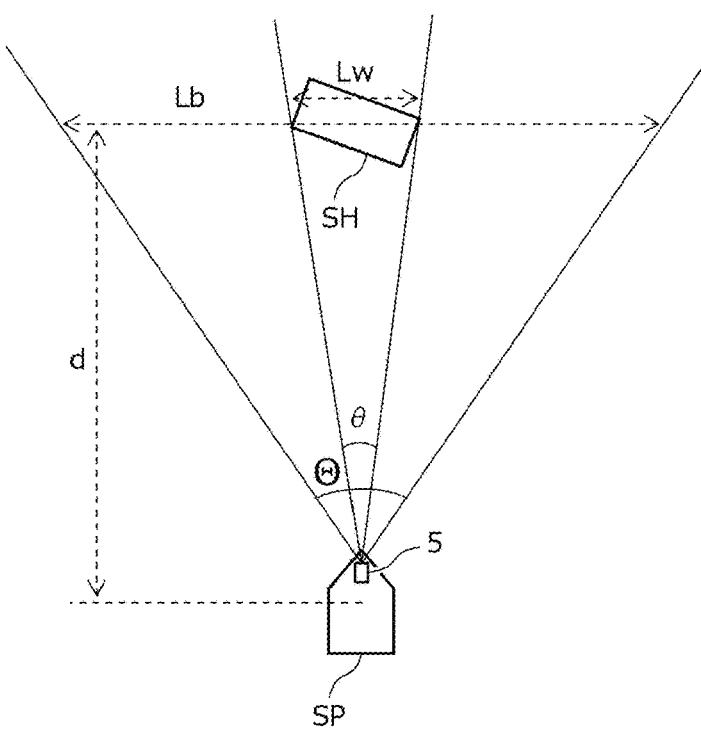
FIG. 8 is a diagram illustrating an example for calculating a ship body length.

Specifically, as shown in FIG. 8, firstly, the ship body length estimating unit 33 calculates the occupancy angle $\theta$ of the other ship SH within a view angle $\Theta$ based on the dimension Lb of the image in the horizontal direction, the dimension Lw of the region of the other ship SH in the horizontal direction, and the view angle $\Theta$ of the camera 5 in the horizontal direction. The dimensions Lb, Lw are dimensions (e.g., numbers of pixels) in the image. The distance d represents a distance in the actual space detected by the radar 3.

The view angle $\Theta$ is an angle representing a range included in the image when imaged by using the camera 5, and is an angle determined by the lens of the camera 5. The occupancy angle $\theta$ of the other ship SH is an angle representing the range occupied by the other ship SH, and is an angle between the left end and the right end of the target SH with the camera 5 as the center.

Since the ratio between the dimension Lb of the image in the horizontal direction and the dimension Lw of the region of the other ship SH in the horizontal direction and the ratio between the view angle $\Theta$ of the camera 5 in the horizontal direction and the occupancy angle $\theta$ of the other ship SH can be considered as the same, the occupancy angle $\theta$ of the other ship SH can be calculated accordingly.

More specifically, the ship body length estimating unit 33 may also calculate the occupancy angle $\theta$ of the target SH in the view angle $\Theta$ further based on the focal point distance and the optical center of the camera 5, in addition to the dimension Lb of the image in the horizontal direction, the dimension Lw of the region of the target SH in the horizontal direction, and the view angle $\Theta$ of the camera 5 in the horizontal direction. That is, considering camera-internal parameters of a perspective projection model, the occupancy angle $\theta$ of the target SH may also be calculated by using the focal point distance and the optical center of the camera 5 representing the camera-internal parameters.

Figure 9:
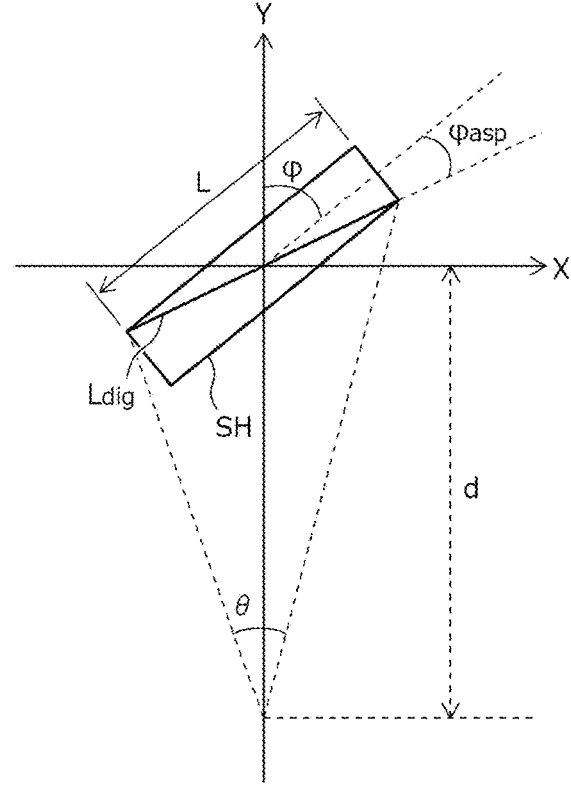
FIG. 9 is a diagram illustrating an example for calculating a ship body length.

In addition, as shown in FIG. 9, the ship body length estimating unit 33 estimates the ship body length L of the other ship SH based on the occupancy angle $\theta$ of the other ship SH, the distance d from the own ship SP to the other ship SH, a relative course $\varphi$ of the other ship SH with respect to the own ship, and a deviation angle $\varphi_{asp}$ in accordance with the aspect ratio of the ship body.

A ship body length L of the other ship SH is represented by Equation 1 below.

$$L = L_{dig} \cos \varphi_{asp} \qquad \text{[Equation 1]}$$

$L_{dig}$ is the length of the diagonal when the ship body of the other ship SH is assumed to be rectangular, and corresponds to the occupancy angle $\theta$ of the other ship SH (that is, corresponds to the portion appearing in the image). $\varphi_{asp}$ is a deviation angle of $L_{dig}$ with respect to the course $\varphi$ of the other ship that is determined by the aspect ratio of the ship body, and is represented by $\tan^{-1}$ (ship body width/ship body length).

$L_{dig}$ is represented by Equation 2 in the following.

$$L_{dig} = 2d \left( A + \sqrt{A^2 + 1} \right) \qquad \text{[Equation 2]}$$
$$A = -\frac{\sin(\varphi + \varphi_{asp})}{\tan \theta}$$

Figure 10:
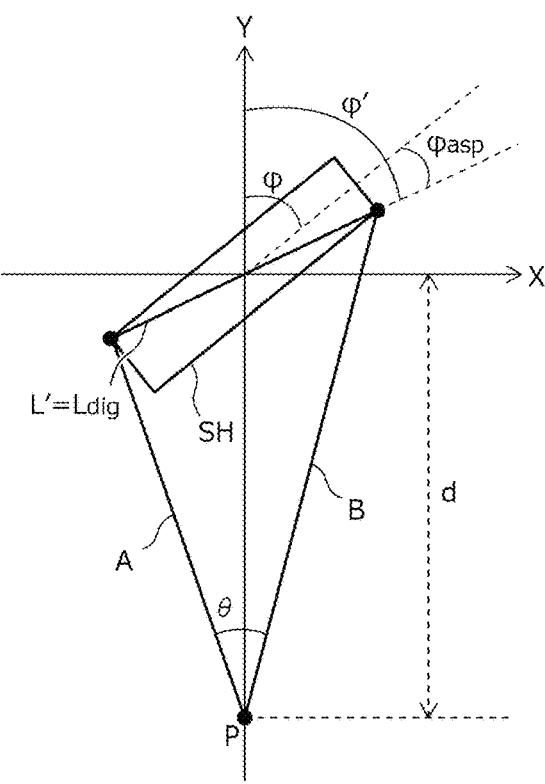
FIG. 10 is a diagram illustrating an example for calculating a ship body length.

Regarding the derivation of Equation 2, the description is made by using the case where $\varphi$ is in the range of 0° to 90° as an example, with reference to FIG. 10.

In the same figure, a line segment from a position P of the own ship to the left end of the diagonal of the other ship SH is set as A, and a line segment to the right end is set as B. In addition, the length of the diagonal of the other ship SH is set as L'($=L_{dig}$), and a combined angle of the course $\varphi$ of the other ship SH and the deviation angle $\varphi_{asp}$ is set as $\varphi'$.

A triangle surrounded by the left end and the right end of the diagonal of the other ship SH and the position P of the own ship is represented by Equation 3 below.

$$\frac{1}{2} AB \sin \theta = \frac{1}{2} dL' \sin \varphi' \qquad \text{[Equation 3]}$$

When 2 cos $\theta$ is applied to two ends of Equation 3, Equation 4 as follows is yielded.

$$AB \sin \theta \cos \theta = dL' \sin \varphi' \cos \theta \qquad \text{[Equation 4]}$$

In addition, vectors A, B when the position P of the own ship is set as the origin are represented by Equation 5 as follows.

$$\vec{A} = \left( -\frac{L'}{2}\sin\varphi', \ -\frac{L'}{2}\cos\varphi' + d \right) \qquad \text{[Equation 5]}$$

$$\vec{B} = \left( \frac{L'}{2}\sin\varphi', \ \frac{L'}{2}\cos\varphi' + d \right)$$

By taking the inner product of the vectors A and B, Equation 6 below is yielded.

$$-\frac{L'^2}{4}\sin^2\varphi' + d^2 - \frac{L'^2}{4}\cos^2\varphi' = AB\cos\theta \qquad \text{[Equation 6]}$$

By substituting Equation 6 6 into Equation 4, Equation 7 as follows is yielded.

$$\sin\theta\left( -\frac{L'^2}{4}\sin^2\varphi' + d^2 - \frac{L'^2}{4}\cos^2\varphi' \right) = dL'\sin\varphi'\cos\theta \qquad \text{[Equation 7]}$$

By arranging Equation 7, Equation 8 for L' as follows is yielded.

$$L'^2 + 4d\sin\varphi' \cdot \frac{\cos\theta}{\sin\theta}L' - 4d^2 = 0 \qquad \text{[Equation 8]}$$

By solving Equation 8 for L' using a solution formula, Equation 9 is yielded.

$$L' = 2d\left( -\sin\varphi' \cdot \frac{\cos\theta}{\sin\theta} \pm \sqrt{\left(\sin\varphi' \cdot \frac{\cos\theta}{\sin\theta}\right)^2 + 1} \right) \qquad \text{[Equation 9]}$$

$$= 2d\left( -\frac{\sin\varphi'}{\tan\theta} \pm \sqrt{\left(\frac{\sin\varphi'}{\tan\theta}\right)^2 + 1} \right)$$

Here, since the distance is positive, Equation 10 as follows is yielded.

$$L' = 2d\left( -\frac{\sin\varphi'}{\tan\theta} + \sqrt{\left(\frac{\sin\varphi'}{\tan\theta}\right)^2 + 1} \right) \qquad \text{[Equation 10]}$$

Here, $L'=L_{dig}$, and $\varphi'=\varphi+\varphi_{asp}$. Therefore, Equation 10 is the same as Equation 2.

The ship body length estimating unit 33 estimates the ship body length L of the other ship SH like the above. The ship body length L of the other ship SH estimated by the ship body length estimating unit 33 is included in the target data together with the position, the ship velocity, and the course, etc., of the other ship SH and registered in the camera management DB 23.

In the embodiment, although the region of the other ship SH is detected from the image imaged by the camera 5 through image recognition, the disclosure is not limited thereto. The region of the other ship SH may also be detected through image recognition from image data including the other ship as observed by an other sensor, such as a light detection and ranging (LiDAR). The sensor may have an azimuth resolution higher than that of the radar 3.

Figure 11:
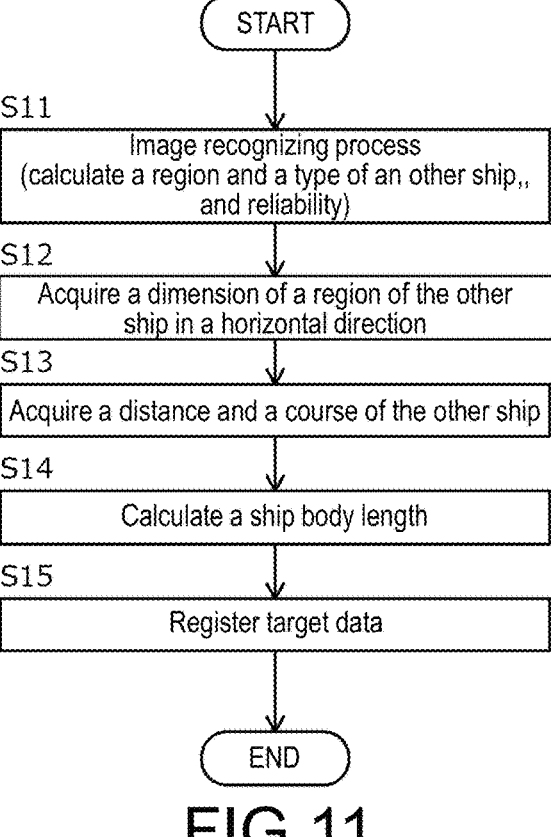
FIG. 11 is a diagram illustrating a procedural example of a target monitoring method.

FIG. 11 is a diagram illustrating a procedural example of a target monitoring method realized in the target monitoring system 100. The same figure mainly illustrates a process of estimating the ship body length of the other ship. The target monitoring device 1 executes the process shown in the same figure according to the program.

When acquiring the image imaged by the camera 5, the target monitoring device 1 performs an image recognizing process, and calculates the region of the other ship included in the image, the type of the other ship, and the reliability that is estimated (S11, the process as the image recognizing unit 31).

Then, the target monitoring device 1 acquires the dimension of the region of the other ship in the horizontal direction calculated through the image recognizing process (S12). The dimension of the region of the other ship in the horizontal direction is the dimension Lw of the boundary box BB in the horizontal direction (see FIG. 5).

Then, based on the target data detected by the radar 3, the target monitoring device 1 obtains the distance from the own ship to the other ship and the course of the other ship (S13, the process as the distance and course acquiring unit 32).

Then, based on the dimension of the region of the other ship in the horizontal direction, the distance from the own ship to the other ship, and the course of the other ship, the target monitoring device 1 estimates the ship body length of the other ship (S14 (the process as the ship body estimating unit 33).

Then, the target monitoring device 1 generates the target data including the ship body length of the other ship, together with the position, the ship velocity, and the course, etc., of the other ship in the camera management DB 23 (S15). Accordingly, a series of processes on the image have ended.

Although the embodiments of the disclosure have been described above, the disclosure is not limited thereto. It goes without saying that various modifications can be made by those skilled in the art.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A target monitoring device, comprising:
processing circuitry configured to:
   acquire image data comprising a ship observed by an imaging sensor,
   detect a region of the ship comprised in the image data,
   acquire a distance to the ship from an observation position detected by a sensor that is different from the imaging sensor,
   acquire a course of the ship detected by the sensor that is different from the imaging sensor, and
   estimate a ship body length of the ship based on a dimension of the region of the ship in a horizontal direction, the distance to the ship, and the course of the ship.

2. The target monitoring device as claimed in claim 1, wherein the processing circuitry is further configured to estimate the ship body length of the ship further based on a particular ship body aspect ratio.

3. The target monitoring device as claimed in claim 1, wherein the imaging sensor is a camera, and the processing circuitry is further configured to:

calculate an occupancy angle of the ship in a view angle of the camera in the horizontal direction based on a dimension of the image data in the horizontal direction, the dimension of the region of the ship in the horizontal direction, and the view angle, and estimate the ship body length of the ship based on the occupancy angle of the ship, the distance to the ship, and the course of the ship.

4. The target monitoring device as claimed in claim 2, wherein the imaging sensor is a camera, and the processing circuitry is further configured to:

calculate an occupancy angle of the ship in a view angle of the camera in the horizontal direction based on a dimension of the image data in the horizontal direction, the dimension of the region of the ship in the horizontal direction, and the view angle, and estimate the ship body length of the ship based on the occupancy angle of the ship, the distance to the ship, and the course of the ship.

5. The target monitoring device as claimed in claim 3, wherein the processing circuitry is further configured to calculate the occupancy angle of the ship in the view angle based on the dimension of the image data in the horizontal direction, the dimension of the region of the ship in the horizontal direction, the view angle of the camera in the horizontal direction, a focal point distance of the camera, and an optical center of the camera.

6. The target monitoring device as claimed in claim 4, wherein the processing circuitry is further configured to:

calculate the occupancy angle of the ship in the view angle based on the dimension of the image data in the horizontal direction, the dimension of the region of the ship in the horizontal direction, the view angle of the camera in the horizontal direction, a focal point distance of the camera, and an optical center of the camera.

7. The target monitoring device as claimed in claim 1, wherein the sensor that is different is a radar, and the processing circuitry is further configured to acquire the distance to the ship based on data detected by the radar.

8. The target monitoring device as claimed in claim 2, wherein the sensor that is different is a radar, and the processing circuitry is further configured to acquire the distance to the ship based on data detected by the radar.

9. The target monitoring device as claimed in claim 3, wherein the sensor that is different is a radar, and the processing circuitry is further configured to acquire the distance to the ship based on data detected by the radar.

10. The target monitoring device as claimed in claim 1, wherein the sensor that is different is a radar, and the processing circuitry is further configured to acquire the course of the ship based on data detected by the radar.

11. The target monitoring device as claimed in claim 2, wherein the sensor that is different is a radar, and the processing circuitry is further configured to acquire the course of the ship based on data detected by the radar.

12. The target monitoring device as claimed in claim 3, wherein the sensor that is different is a radar, and the processing circuitry is further configured to acquire the course of the ship based on data detected by the radar.

13. The target monitoring device as claimed in claim 1, wherein the processing circuitry is further configured to detect a boundary box surrounding the ship comprised in the image data as the region of the ship.

14. The target monitoring device as claimed in claim 2, wherein the processing circuitry is further configured to detect a boundary box surrounding the ship comprised in the image data as the region of the ship.

15. The target monitoring device as claimed in claim 3, wherein the processing circuitry is further configured to detect a boundary box surrounding the ship comprised in the image data as the region of the ship.

16. A target monitoring method, comprising:

acquiring image data comprising a ship observed by an imaging sensor;

detecting a region of the ship comprised in the image data;

acquiring a distance to the ship from an observation position detected by a sensor that is different from the imaging sensor;

acquiring a course of the ship detected by the sensor that is different from the imaging sensor; and estimating a ship body length of the ship based on a dimension of the region of the ship in a horizontal direction, the distance to the ship, and the course of the ship.

17. A non-transient computer-readable recording medium, recording a program, executed by a computer to:

acquire image data comprising a ship observed by an imaging sensor;

detect a region of the ship comprised in the image data;

acquire a distance to the ship from an observation position detected by a sensor that is different from the imaging sensor;

acquire a course of the ship detected by the sensor that is different from the imaging sensor; and estimate a ship body length of the ship based on a dimension of the region of the ship in a horizontal direction, the distance to the ship, and the course of the ship.

* * * * *